United States Patent
Suzuki et al.

(10) Patent No.: US 8,535,742 B2
(45) Date of Patent: Sep. 17, 2013

(54) METHOD FOR PROCESSING OF FISH EGG AND PROCESSED FISH EGG PRODUCED BY THE METHOD

(75) Inventors: Yoichi Suzuki, Gotenba (JP); Izumi Sakagami, Hiratsuka (JP)

(73) Assignees: Shonan Pure Co., Ltd., Kanagawa (JP); Mizonokuchi Fishes Company, Kanagawa (JP)

(*) Notice: Subject to any disclaimer, the term of this patent is extended or adjusted under 35 U.S.C. 154(b) by 334 days.

(21) Appl. No.: 12/527,768

(22) PCT Filed: Feb. 19, 2008

(86) PCT No.: PCT/JP2008/052696
§ 371 (c)(1),
(2), (4) Date: Aug. 19, 2009

(87) PCT Pub. No.: WO2008/102745
PCT Pub. Date: Aug. 28, 2008

(65) Prior Publication Data
US 2010/0034922 A1   Feb. 11, 2010

(30) Foreign Application Priority Data
Feb. 19, 2007   (JP) .................................. 2007-37960

(51) Int. Cl.
*A23J 1/04*   (2006.01)
(52) U.S. Cl.
USPC ............................................. 426/7; 426/643
(58) Field of Classification Search
USPC .................................................... 426/7, 643
See application file for complete search history.

(56) References Cited

U.S. PATENT DOCUMENTS 4,886,673 A   12/1989 Hammes
7,064,101 B2 *   6/2006 Tanaka et al. .................. 510/446

FOREIGN PATENT DOCUMENTS

| JP | 2-5838 | 1/1990 |
| JP | 7-107944 | 4/1995 |
| JP | 11-155531 | 6/1999 |
| JP | 2000-245400 | 9/2000 |
| JP | 2000-325049 | 11/2000 |
| JP | 2004-154055 | 6/2004 |
| JP | 2004-283131 | 10/2004 |
| JP | 2006-166815 | 6/2006 |

OTHER PUBLICATIONS

JP-2006-166815—Machine Translation.*
International Search Report, 2008.

* cited by examiner

*Primary Examiner* — D. Lawrence Tarazano
*Assistant Examiner* — Hamid R Badr
(74) *Attorney, Agent, or Firm* — Smith, Gambrell & Russell, LLP (57) ABSTRACT

Provided are a method of processing fish eggs, which can produce fish eggs having a good color tone without using a color-developing agent such as a nitrite or by using a reduced amount of the color-developing agent, and processed fish eggs produced by the method. A lactic acid bacterium, which can improve the color tone of the fish eggs, is added to the fish eggs. The lactic acid bacterium is preferably a lactic acid bacterium belonging to the genus *Lactobacillus* or *Carnobacterium*, more preferably *Lactobacillus coryniformis* K12 (Deposition Number: FERM BP-10945) or *Carnobacterium maltaromaticum* B64 (Deposition Number: FERM BP-10449).

4 Claims, 2 Drawing Sheets

METHOD FOR PROCESSING OF FISH EGG AND PROCESSED FISH EGG PRODUCED BY THE METHOD

TECHNICAL FIELD

The present invention relates to fish egg processing method having an effect of improving a color tone of fish eggs and to processed fish eggs produced by the method.

BACKGROUND ART

Processed fish-egg products include: cod roe using cod eggs as a raw material; spicy cod roe; trout roe using trout eggs as a raw material; salmon caviar or salmon roe using salmon eggs as a raw material; flying fish roe using flying-fish eggs as a raw material; botargo using mullet or tuna eggs as a raw material; caviar using sturgeon eggs as a raw material; herring roe using herring eggs as a raw material; and kouruka using sweetfish eggs as a raw material. Those processed fish-egg products are generally shipped after increasing their product storage lives by salting the raw material fish eggs. In addition, spicy cod roe, for example, may include a salting processing step by immersion in saline and an aging step of aging after soaking in a flavoring solution.

The color tone, texture, taste, and the like of the processed fish-egg products have an effect on the level of the product quality. For this reason, processes to brighten the color tone of cod roe, spicy cod roe, salmon caviar, salmon roe, or the like are performed, for example, by adding color-developing agents such as nitrites to the raw material fish eggs.

However, nitrites which are often used as the color-developing agents react with amines contained in the fish eggs in a large amount to produce N-nitrosamines. The N-nitrosamines is pointed out as being carcinogenic.

As a result, various proposals have been made for improving the color tone of the fish eggs without uses of color-developing agents such as nitrites.

For example, in Patent Document 1 described below, there is disclosed a method of preventing color loss in fish eggs, which is characterized in that a yeast treatment material is added to the fish eggs.

Further, in Patent Document 2 described below, use amount of the nitrites is reduced by use of ferulic acid and nicotinic-acid amide as a color-developing aid.

Further, in Patent Document 3 described below, a method of manufacturing spicy cod roe is disclosed, the method including a salting step by soaking cod eggs in saline and an aging step by aging after soaking the cod eggs in a flavoring solution. The method is characterized in that the salt used in the saline in the salting step is a salt mixed with a *Sasa veitchii* component.

On the other hand, the inventors of the present invention have proposed, in Patent Document 4 described below, a method of improving the color tone of meat or fish containing red-pigment proteins through addition of microorganisms belonging to the genus *Carnobacterium* or *Lactobacillus*.

Patent Document 1: JP 2000-245400 A
Patent Document 2: JP 2000-325049 A
Patent Document 3: JP 2004-283131 A
Patent Document 4: JP 2006-166815 A

DISCLOSURE OF THE INVENTION

Problems To Be Solved By the Invention

However, the methods disclosed in the above-mentioned Patent Documents 1 to 3 avoid use of color-developing agents such as nitrites or enable a reduction in the use amount. However, none of those disclosures may be inferred to perform a practical color tone improving effect of the type, which may be used in substitution of a color-developing agent.

The method described in the above-mentioned Patent Document 4 is aimed to apply an additive to meat or fish having red-pigment proteins, and it has not been investigated whether or not the method is also effective in color improvement of the fish eggs.

Thus, it is an object of the present invention to provide a fish egg processing method, which has a high color tone improving effect on fish eggs, enables good color tone of fish eggs without the use, or with a reduction in use, of color-developing agents such as nitrites, and which enables suppression of color loss in the fish eggs, and processed fish eggs produced using the method.

Means For Solving the Problems

In order to achieve the above-mentioned object, a first aspect of the present invention provides a method of processing fish eggs, including adding a lactic acid bacterium having a color tone improving effect on fish eggs to the fish eggs.

According to the present invention, the addition of a lactic acid bacterium to the fish eggs enables improvement of the color tone by particularly strengthening red color in the fish egg owing to an action of the lactic acid bacterium, though the reason for the operation of the lactic acid bacterium remains elusive. Consequently a processed fish-egg product is obtained with a good color tone without use of, or a reduction in the use amount of, a color-developing agent such as nitrite. Further effects are also realized in that product storage stability is improved and better taste is provided by the suppression of the propagation of general viable bacteria other than the lactic acid bacterium. The concept of "color improvement" in the present invention does not only mean achievement of a good color tone in which red color in particular are strengthened in the fish egg, but also includes the suitable maintenance of color tone by suppression of color loss in the fish egg.

In the present invention, the lactic acid bacterium having a color tone improving effect is preferably a lactic acid bacterium belonging to the genus *Lactobacillus* or the genus *Carnobacterium*. Further, the lactic acid bacterium having a color tone improving effect is more preferably at least one species selected from the group consisting of *Lactobacillus coryniformis, Lactobacillus plantarum, Lactobacillus sakei, Lactobacillus fermentum, Lactobacillus casei, Lactobacillus farciminis, Lactobacillus kefiri, Carnobacterium divergens*, and *Carnobacterium maltaromaticum*. Further, the lactic acid bacterium having a color tone improving effect is still more preferably *Lactobacillus coryniformis* K12 of Deposition Number FERM BP-10945 or *Carnobacterium maltaromaticum* B64 of Deposition Number FERM BP-10449. The above-mentioned lactic acid bacteria are easy to handle, and can provide a higher color tone improving effect.

Further, in the present invention, it is preferred that the above-mentioned lactic acid bacterium be added before, during, or after soaking treatment, when the fish eggs are subjected to the soaking treatment using an aqueous solution containing salt and/or a flavoring solution. When the soaking treatment is performed using an aqueous solution containing a salt and/or a flavoring solution, a processed fish-egg product with good taste, favorable keeping qualities, and excellent color tone may be obtained by adding the lactic acid bacterium having a color tone improving effect at the timing described above.

Further, in the present invention, the fish eggs are preferably eggs selected from cods such as Alaska pollack and Pacific cod, salmons and trouts such as salmon and trout, flying fish, mullet, sea bream, sturgeon, herring, tuna, lampfish, shishamo smelt, sandfish, and sweetfish.

On the other hand, another aspect of the present invention is to provide processed fish eggs obtained using the above-mentioned method. The processed fish eggs, as described above, have good color tone, in particular, strengthened red color without the use of a color-developing agent such as nitrite, or a reduction in the use amount thereof.

Effects of the Invention

According to the present invention, the color tone of the fish eggs may be improved, or color loss in the fish eggs may be suppressed, without the use of a color-developing agent such as nitrite, or a reduction in the use amount thereof. Further, the effects are also realized in that the product storage stability is improved and better taste is provided by suppressing the propagation of general viable bacteria other than the lactic acid bacterium.

BEST MODE FOR CARRYING OUT THE INVENTION

In the present invention, examples of the fish eggs include: cod roe or spicy cod roe using cod eggs as a raw material; trout roe using trout eggs as a raw material; salmon caviar or salmon roe using salmon eggs as a raw material; flying fish roe using flying-fish eggs as a raw material; botargo using mullet or tuna eggs as a raw material; caviar using sturgeon eggs as a raw material; and herring roe using herring eggs as a raw material. Those fish eggs after removal from the fish body may be used after thawing of the frozen product.

In the present invention, the fish eggs may be processed using various kinds of conventionally known methods. For example, the processed fish-egg product of the present invention may be obtained by merely adding a lactic acid bacterium having a color tone improving effect after washing raw fish eggs in saline or the like. Preferably, a soaking step of immersion in saline or a flavoring solution is included. More preferably, a salting step of immersing the raw fish eggs in saline followed by an aging step of soaking in a flavoring solution are included. In this case, the addition of the lactic acid bacterium may be performed at any timing before the process of soaking in saline or a flavoring solution, during the soaking process, or after the soaking process.

There is no particular limitation on the flavoring solution and, for example, there may be preferably used an aqueous solution obtained by suitably selecting and dissolving a salt, sugars, amino acids, and nucleic acid-based seasonings, organic acids such as citric acid, malic acid, and ascorbic acid, phosphates, alcohol, sake, sweet sake, or spices such as hot pepper. Extracts of kelp, bonito flakes, or the like may also be added. There is no particular limitation on the amount of the salt to be contained in the saline or flavoring solution. However, generally, the salt concentration preferably be from 1 mass % to a saturated concentration, and more preferably, from a 5 mass % to the saturated concentration.

A lactic acid bacterium having a color tone improving effect on fish eggs is used in the present invention. This type of lactic acid bacterium may be collected by screening using the following type of method, for example.

Specifically, a MRS-modified chalk agar medium with 1 mass % of sodium chloride to be added to a commercially-available MRS medium is used and anaerobic culture is performed at 20° C. for 7 days. After that, for colonies dissolving calcium carbonate to form a clear zone, a primary selection of strains is performed taking into account the size and shape of the colonies. Next, a culture liquid of strains subjected to the primary selection in the above-mentioned medium is inoculated to non-colored nitrite-free sliced ham and a secondary selection is performed with respect to strains causing a red-color change of the ham. In addition, a final selection is performed by inoculating cod roe which is free of nitrites and colorants with the selected strains, and by selecting strains causing a red-color change in the cod roe. Note that the final selection may be performed using not only cod roe but also other fish eggs, and may also be performed using an effect of suppressing color loss of the fish eggs as an index. Screening is preferably performed by using the fish eggs that is intended to be subjected to color tone improvement. To observe the level of red-color change after inoculation with the strains, the observation of color tone is performed during a storage period after inoculation of about several hours to 2 weeks. Storage conditions may include anaerobic conditions using vacuum packaging or aerobic conditions such as packaging without the removal of air.

The observation of color tone may be performed visually, or reflectance or L*a*b* may be measured using a spectrocolorimeter. In a preferred aspect of a method for evaluation using a spectrocolorimeter, as shown in the examples described below, an a* value may be used to be compared with a control, or a color difference ($\Delta E$) in a total L*a*b* system may be calculated. In this case, evaluation standards cannot be generalized due to the differences in measurement apparatuses. However, generally preferably, when the difference in a* value is 0.6 or more, the strain is evaluated to have a color tone improving effect, and more preferably, when the difference in a* value is 1 or more, the strain is evaluated to have a color tone improving effect. Further, preferably, when the color difference ($\Delta E$) in the entire L*a*b system is 0.6 or more, the strain is evaluated to have a color tone improving effect, and more preferably, when the color difference ($\Delta E$) in the entire L*a*b system is 1 or more, the strain is evaluated to have a color tone improving effect.

Using the above-mentioned screening method, the inventors of the present invention acquired a strain having an excellent color tone improving effect on food-additive free cod roe. A phylogenetic tree of allied species to the strain was prepared on the basis of 16S rDNA base sequence analysis.

Specifically, DNA was extracted from the above strain and 16S rRNA regions of the DNA were amplified using a PCR method. Sequence analysis of the amplified DNA was performed using an ABI PRISM 310 Genetic Analyzer (Applied Biosystems) and the resulting sequences were compared with sequences registered in GenBank and a database of MicroSeq Analysis Software (Applied Biosystems). Further, a phylogenetic tree for allied species was prepared by a neighbor-joining method (NJ method) using MicroSeq Analysis Software.

Figure 1:
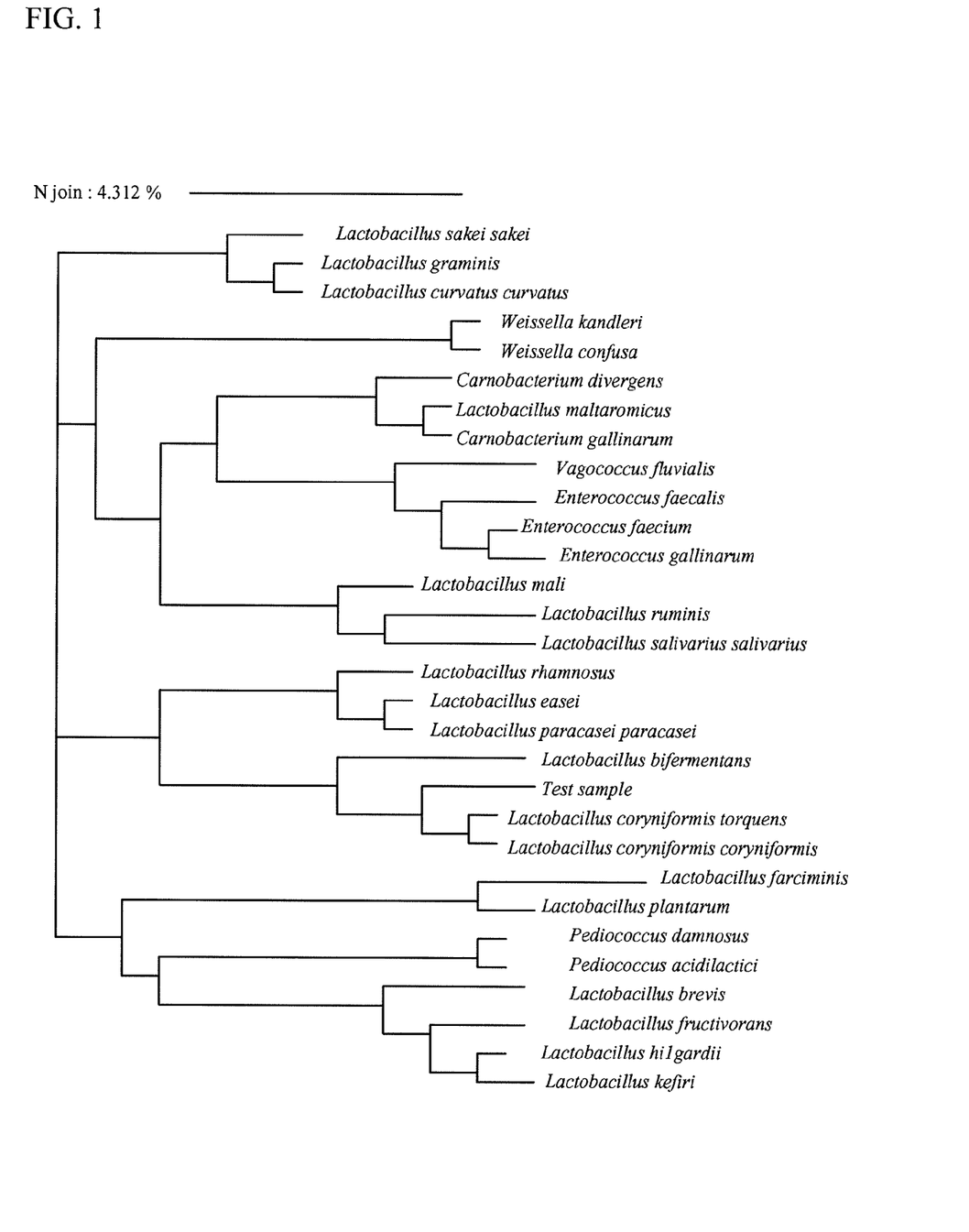
FIG. 1 is a view illustrating a phylogenetic tree of closely allied species to *Lactobacillus coryniformis* K12 (Deposition Number: FERM BP-10945).

As a result, the above-mentioned strain was most closely related to *Lactobacillus coryniformis* subsp. *Torquens* and was identified as *Lactobacillus coryniformis*. The phylogenetic tree for allied species prepared by the neighbor-joining method (NJ method) is shown in FIG. 1, and the non-match rate for the base sequences of the above-mentioned strain and two allied species is shown in Table 1. A 1,472-bp base sequence of the above-mentioned strain was decoded and the entire decoded sequence was subjected to phyloanalysis.

TABLE 1

| Bacteria name | Non-match rate (%) with test bacteria |
|---|---|
| Lactobacillus coryniformis subsp. torquens | 0.95 |
| Lactobacillus coryniformis subsp. coryniformis | 1.05 |

Lactobacillus is a gram-positive rod-shaped bacterium fermenting sugar to produce mainly lactic acid and is isolated from foods such as dairy products or grains, silage, or the intestinal tract of animals, for example. It is further known as a group of bacteria involved in the manufacture of many fermented foods such as yogurt or lactic acid bacteria beverages. Almost all the lactic acid produced by Lactobacillus coryniformis subsp. Torquens is D-lactic acid and is known to be isolated from silage, bovine feces, and waste water, for example. Lactobacillus coryniformis is known as a lactic acid bacterium of "sushi with fermented mackerel".

The above-mentioned strain has been deposited under Lactobacillus coryniformis K12 (Lactobacillus coryniformis K12, Deposition Number FERM BP-10945) with the Patent Microorganisms Depositary Center at the National Institute of Advanced Science and Technology. The bacterium deposited under Deposition Number FERM BP-10945 is the organism deposited with the Patent Microorganisms Depositary Center under Deposition Number FERM BP-21211 as transferred to the International Microorganism Depositary pursuant to the Budapest Treaty.

The inventors of the present invention used the above-mentioned screening method to examine the color tone improving effect on cod roe with respect to two strains Carnobacterium maltaromaticum B64, Deposition Number FERM BP-10449, and Lactobacillus coryniformis synonym R11, Deposition Number FERM BP-10450, which were isolated from the final salted solution of nitrite-free ham during the invention disclosed in Patent Document 4.

As a result, a color tone improving effect on cod roe was not observed with respect to Lactobacillus Coryniformis synonym R11. However, a color tone improving effect on cod roe was observed for Carnobacterium maltaromaticum B64. Thus, it was understood that bacteria having a color tone improving effect on meat as described in Patent Document 4 would not necessarily have a color tone improving effect on fish eggs.

Table 2 below shows various bacteriological properties of Carnobacterium maltaromaticum B64 (Deposition Number FERM BP-10449).

TABLE 2

| Morphology | Rod-shaped bacterium |
|---|---|
| Gram-staining property | + |
| Sporulation | − |
| Motility | − |
| Behavior to oxygen | Facultative anaerobe |
| Catalase | − |
| Produced lactic acid | L (+) |
| Gas production from glucose | − |
| Gas production from gluconate | − |
| Growth at 15° C. | + |
| Growth at 45° C. | − |
| Sugar fermentanility | |
| L-Arabinose | − |
| D-Xylose | − |
| Rhamnose | − |
| Sorbose | − |
| Ribose | + |
| Glucose | + |
| Mannose | + |
| Fructose | + |
| Galactose | + |
| Sucrose | + |
| Maltose | + |
| Cellobiose | + |
| Lactose | + |
| Trehalose | + |
| Melibiose | −[*1] |
| Raffinose | − |
| Melezitose | −[*1] |
| Starch | weak |
| Mannitol | + |
| Sorbitol | −[*1] |
| Esculin | + |
| Salicin | + |
| Amygdalin | + |
| Gluconate | + |
| GC content of bacterial DNA (mol %)[*2] | 35 |

[*1] atypical character
[*2] using HPLC method

Lactobacillus coryniformis K12 and Carnobacterium maltaromaticum B64 may be cultivated using an APT medium (trade name: DIFCO 265510), a GYP medium, an MRS medium (trade name: OXOID CM359), a BHI medium (trade name: BD BBL 4312424), and the like having culture compositions as shown in Tables 3 to 6 below. The above-mentioned lactic acid bacteria are facultative anaerobes, and therefore, a culturing method thereof is preferably static culture or culture by replacement with carbon dioxide gas. Culturing is preferably performed at a condition of at 25° C. for 15 to 24 hours.

TABLE 3

| APT medium (per 1,000 ml of medium) | |
|---|---|
| Yeast extract | 7.5 g |
| Pancreatin digest of casein | 12.5 g |
| Dextrose | 10.0 g |
| Sodium citrate | 5.0 g |
| Thiamine hydrochloride | 0.001 g |
| Sodium chloride | 5.0 g |
| Potassium dihydrogenphosphate | 5.0 g |
| Manganese chloride | 0.14 g |
| Magnesium sulfate | 0.8 g |
| Ferrous sulfate | 0.04 g |
| Polysorbate 80 | 0.2 g |

Sterilization at 121° C. for 15 minutes, pH 6.7 ± 0.2

TABLE 4

| GYP medium (per 1,000 ml of medium) | |
|---|---|
| Glucose | 10.0 g |
| Bacto yeast extract | 10.0 g |
| Bacto peptone | 10.0 g |
| Beef extract | 2.0 g |
| Sodium acetate trihydrate | 10.0 g |
| Tween 80 solution[*1] | 10.0 ml |
| Solution of salts[*2] | 10.0 ml |
| Sodium chloride | 5.0 g |

Sterilization at 121° C. for 15 minutes, pH 6.9 ± 0.1
[*1] 50 mg/ml aqueous solution
[*2] in 1 ml of aqueous solution Magnesium sulfate heptahydrate: 40 mg Manganese sulfate tetrahydrate: 2 mg Ferrous sulfate heptahydrate: 2 mg Sodium chloride: 2 mg

TABLE 5

| MRS medium (per 1,000 ml of medium) | |
|---|---|
| Peptone | 10.0 g |
| Beef extract | 8.0 g |
| Yeast extract | 4.0 g |
| Glucose | 20.0 g |
| Tween 80 | 1.0 ml |
| Dipotassium hydrogenphosphate | 2.0 g |
| Sodium acetate trihydrate | 5.0 g |
| Ammonium citrate | 2.0 g |
| Magnesium sulfate heptahydrate | 0.2 g |
| Manganese sulfate tetrahydrate | 0.05 g |

Sterilization at 121° C. for 15 minutes, pH 6.2 ± 0.2

TABLE 6

| BHI medium (per 1,000 ml of medium) | |
|---|---|
| Brain heart infusion (solid) | 6.0 g |
| Pepsin digest of animal tissue | 6.0 g |
| Sodium chloride | 5.0 g |
| Glucose | 3.0 g |
| Pancreatin digest of gelatin | 14.5 ml |
| Sodium monohydrogenphosphate | 2.5 g |

Sterilization at 121° C. for 15 minutes, pH 7.4 ± 0.2

The lactic acid bacteria used in the present invention are preferably *Lactobacillus coryniformis* K12 and *Carnobacterium maltaromaticum* B64, but is not limited thereto. Any lactic acid bacterium having a color tone improving effect on fish eggs, which may be collected using the above-mentioned screening method may be used. In particular, many lactic acid bacteria belonging to the genus *Lactobacillus* or *Carnobacterium* have a color tone improving effect on fish eggs, and hence lactic acid bacteria which have color tone improving effects on fish eggs may be discovered with relative ease by the above-mentioned screening method using microorganisms belonging to the genus *Lactobacillus* or *Carnobacterium*.

Specifically, as illustrated in the examples below, lactic acid bacteria having a color tone improving effect on fish eggs may be relatively easily discovered from lactic acid bacteria such as *Lactobacillus coryniformis, Lactobacillus plantarum, Lactobacillus sakei, Lactobacillus fermentum, Lactobacillus casei, Lactobacillus farciminis, Lactobacillus kefiri, Carnobacterium divergens*, and *Carnobacterium maltaromaticum*.

There is no particular limitation on the amount of the lactic acid bacteria added to fish eggs, preferably, but 100 to 100,000,000 lactic acid bacteria in number may be added to 1 g of fish eggs.

The addition of lactic acid bacteria, as described above, may be performed at any timing in each of the processing steps on fish eggs but, in particular, is preferably performed when salting or after completion of salting.

The fish eggs processed in the above-mentioned manner may be wrapped in a package or the like, and stored or transported in a refrigerated or frozen state.

Further, in the present invention, another color-improving agent may be added together with the above-mentioned lactic acid bacteria. Examples of such another color-improving agent preferably include one or more kinds selected from yeasts, fruit fermentation products, or extracts thereof.

As the yeast, there may be used one or more selected from a brewer's yeast, a baker's yeast, a sake yeast, a wine yeast, or a shochu yeast belonging to *Saccharomyces cerevisiae*. Commercially-available products of those yeasts may be used. Living yeasts, dead yeasts, or pulverized yeasts may be used. Of those, pulverized yeasts are preferably used. The pulverized yeasts may, for example, be prepared using a known method such as a method of mechanically pulverizing the cell wall of the yeast body or an enzymatic processing method. Preferably, there may be used a suspension obtained by suspending the pulverized yeasts into water or the like, or a supernatant of the suspension. The use of pulverized yeasts facilitates the contact between the contents of the yeast body and the red-pigment protein and enables more efficient color tone improvement.

Further, examples of the fruit fermentation products or extracts thereof include wine (red wine, white wine, or rose wine), cider, fruit wines (using peach, kiwi, apricot, persimmon, or pear as a raw material, for example), and vermouth (prepared by adding herbs to wine). In the present invention, a wine which is free of food additives is preferably used.

EXAMPLES

Example 1

Isolation of Lactic Acid Bacteria Having Color Tone Improving Effect on Fish Eggs Screening for microorganisms having a color tone improving effect on fish eggs is performed by using the method described below.

An MRS-modified chalk agar medium having 1 mass % of sodium chloride added to a commercially-available MRS medium was used and after culturing under anaerobic conditions at 20° C. for 7 days, a primary selection of strains was performed for colonies dissolving calcium carbonate to form a clear zone, taking into account the size, shape, or the like of the colonies.

Next, the culture medium of the strains subjected to the primary selection in the above-mentioned medium was inoculated to non-colored nitrite-free sliced ham and a secondary selection was performed on the basis of strains causing a red-color change of the ham. In addition, a final selection was performed on strains by inoculating cod roe which was free of nitrites and colorants with the strains selected in the secondary selection, storing at 7° C. under anaerobic conditions in vacuum packaging, and finally selecting strains causing red-color change of the cod roe. The red-color change was determined by visual observation.

The K12 strain finally selected in the above-mentioned manner, displayed a 99% homology with *Lactobacillus coryniformis* as a result of identification using 16S rDNA gene base sequencing as described above and has been deposited as *Lactobacillus coryniformis* K12 (Deposition Number FERM BP-10945) on the basis of the identification as *Lactobacillus coryniformis* which is a gram-positive lactic-acid rod-shaped bacterium.

The above-mentioned screening method was also used to examine the color tone improving effect on cod roe of the two known strains *Carnobacterium maltaromaticum* B64 (Deposition Number FERM BP-10449) and *Lactobacillus coryniformis* synonym R11 (Deposition Number FERM BP-10450).

As a result, a color tone improving effect was not observed on cod roe of *Lactobacillus coryniformis* synonym R11, but as for *Carnobacterium maltaromaticum* B64, a color tone improving effect on cod roe was observed.

Thus the two strains *Lactobacillus coryniformis* K12 and *Carnobacterium maltaromaticum* B64 were used in the following experiments.

Example 2

Color Tone Improving Effect on Additive-Free Cod Roe (1) For the purpose of confirming a color tone improving effect on additive-free cod roe, the strains of lactic acid bacteria (K12 strain and B64 strain) obtained in Example 1 were inoculated to food additive-free cod roe and the L*a*b* color was measured.

The food additive-free cod roe was prepared as follows. 10 kg of frozen raw eggs of Alaska pollack were thawed in a refrigerator. Salting was performed by using 6 parts by weight of salt and 10 parts by weight of water with respect to 100 parts by weight of the raw eggs. Soaking was performed by turning by the hand every 30 minutes in a room at a temperature of 20° C. for the first 6 hours. After 6 hours, the whole was left to stand in a refrigerator at 7° C. for 24 hours. The manufacture of the soaked cod roe was completed by draining at 7° C. for 24 hours.

After the lactic acid bacteria were cultured in an MRS medium at 30° C. for 12 hours, the bacteria were washed with physiological saline, and a bacterial solution was prepared by enrichment using a low-temperature centrifuge (trade name: "Himac 7D2", manufactured by Hitachi Ltd.).

Then, the resulting food additive-free cod roe was divided into test group 1 (inoculated with K12 strain), test group 2 (inoculated with B64 strain), and a control group (not inoculated with bacteria) and placed into polyamide bags. After the test groups 1 and 2 were respectively inoculated with a solution of bacterial at $10^7$ CFU/g, the mixture was vacuum packed using a vacuum packaging machine and stored in a fixed-temperature incubator set at 7° C. for 11 days (trade name: "IN800", manufactured by Yamato Scientific Co., Ltd.).

(2) Color Tone Improving Effect

Figure 2:
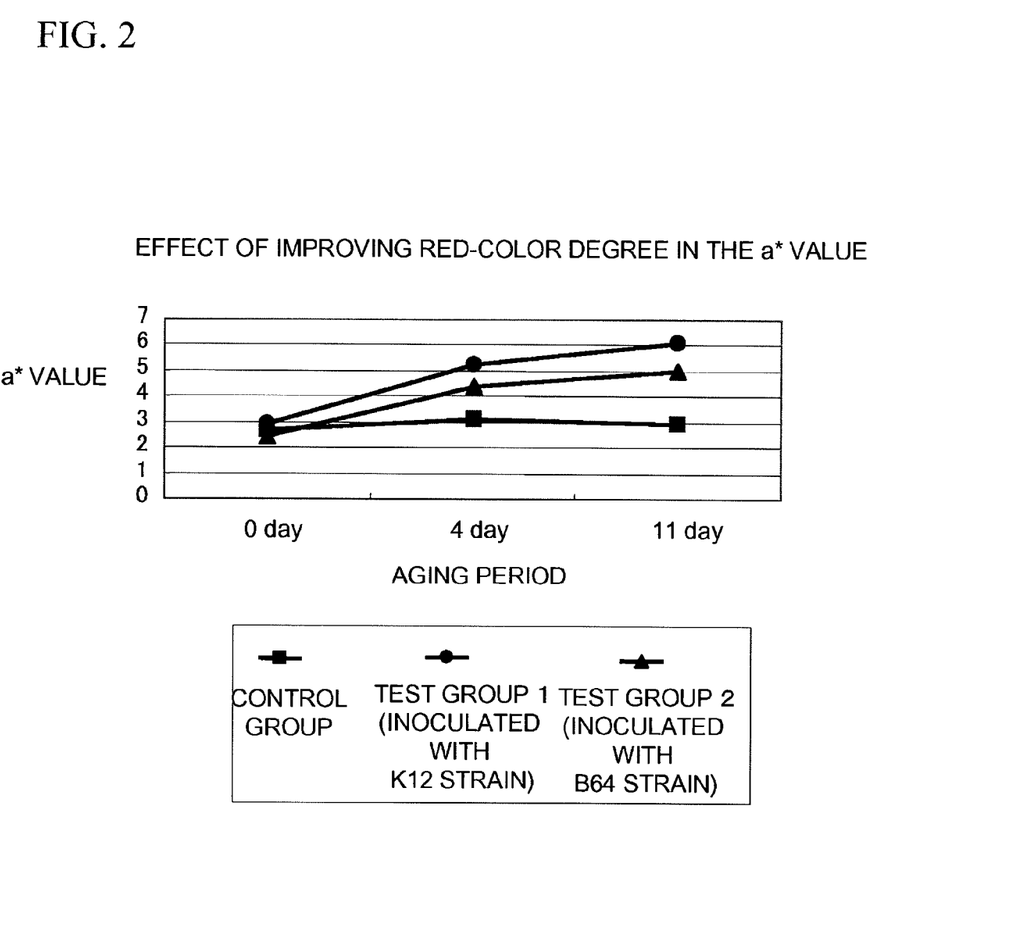
FIG. 2 is a graph illustrating the color improvement results for additive-free cod roe.

On Days 4 and 11 after storage, the L*a*b* color of each group was measured using a spectrocolorimeter (trade name: "508i", manufactured by Konica Minolta Holdings, Inc.) and the average value was calculated. The results are shown in Table 7 and FIG. 2.

TABLE 7

Improvement of a* value due to inoculation with lactic acid bacteria

|  | Control group | Test group 1 (inoculated with K12 strain) | Test group 2 (inoculated with B64 strain) |
|---|---|---|---|
| Day 0 | 2.68 | 2.93 | 2.46 |
| Day 4 | 3.09 | 5.23 | 4.37 |
| Day 11 | 2.91 | 6.11 | 5.00 |

From Table 7, it may be seen that the a* value expressing red color increases in the test groups on Day 4 indicating improvement in the color tone of the cod roe. The a* value increases again on Day 11 indicating further improvement in the color tone of the cod roe.

Example 3

Effect of Improving Color, Flavor, and Storage Stability of Additive-Free Spicy Cod Roe (1) Spicy cod roe was prepared by inoculation with the strain of lactic acid bacteria (K12) obtained in Example 1, and confirmation of an effect of improving color, flavor, and storage stability of the spicy cod roe was performed by measurement of L*a*b*, organoleptic evaluation (color and flavor), and micro bacteriological examination. The bacterial solution was prepared in the same manner as in Example 2.

5 kg of the cod roe manufactured in Example 2 were used to manufacture spicy cod roe by the method described below. Specifically, salted cod roe for soaking was soaked in a flavoring solution at a proportion of 10 parts by weight with respect to 6.0 parts by weight of the soaking solution. The ingredients of the soaking solution were 35% by weight of Japanese sake, 13% by weight of soy sauce, 7% by weight of sweet sake, 5.0% by weight of natural bonito extract, 5.0% by weight of kelp, 2% by weight of hot peppers, and 33% by weight of water.

Next a test group (inoculated with K12 strain) and a control group (not inoculated with strains) were separately placed into polyamide bags in a fixed-temperature incubator set at 7° C. (trade name: "IN800", manufactured by Yamato Scientific Co., Ltd.). After the bacterial solution was inoculated to the flavoring solution for spicy cod roe at $10^7$ CFU/g, the cod roe was vacuum packed using a vacuum packaging machine, soaked for 7 days, and drained for 1 day in order to manufacture spicy cod roe.

(2) Measurement of L*a*b*

The L*a*b* color of each group of spicy cod roe before a soaking process in the spicy flavoring solution and when manufacturing was completed was measured using a spectrocolorimeter (trade name: "508i", manufactured by Konica Minolta Holdings, Inc.) and the average value was calculated. The results are shown in Table 8.

TABLE 8

Spicy cod roe inoculated with k12 strain: a* value before and after soaking in spicy flavoring solution and draining

|  |  | a* average value |  |
|---|---|---|---|
| Test group | Before soaking in spicy flavoring solution | 3.15 | B |
|  | After completion of draining | 7.05 | A |
| Control group | Before soaking in spicy flavoring solution | 3.07 | B |
|  | After completion of draining | 4.00 | B |

*There is a significant difference between different symbols at a significance level of 1%.

From Table 8, in the spicy cod roe, the a* value expressing red color in the test group after completion of draining was significantly increased at a significance level of 1%. It can also be seen that the a* value in the test group is significantly higher than that in the control group and that the red color is improved by lactic acid bacteria.

(3) Organoleptic Evaluation 16 panelists evaluated preference with respect to three items of color, aroma, and flavor by pair testing of the respective test groups and the control group. The method for evaluation involved a relative evaluation on a 7-point scale of −3 to +3 with a value of 0 being assigned when there was no difference between the groups. Then the average values were calculated. The results are shown in Table 9.

TABLE 9

Main effects on each item in organoleptic evaluation

|  | Test group | Control group |
|---|---|---|
| Color preference | 1.000** | −1.000 |
| Aroma preference | 0.063 | −0.063 |
| Flavor preference | 0.156 | −0.156 |

**indicates that there is a significant difference between the test group and the control group at a significance level of 1%.

From Table 9, it may be seen that the color of the test group is significantly preferred compared with that the control group. A tendency is also seen for the aroma and the flavor to be preferred in comparison to the control group.

(4) Effect on Storage Stability

The spicy cod roe was stored at 7° C. for 10 days and the number of microorganisms was measured on Day 10 in the test group and the control group.

A conventional method after cultivation at 25° C. for 5 days according to a plate surface method was utilized for measuring the number of general viable cells by using a standard agar medium (Nissui Pharmaceutical Co., Ltd.) and the numbers of *S. aureus* and gram-positive cocci by using a salt egg agar medium (Nissui Pharmaceutical Co., Ltd.), respectively.

The number of acid-producing bacteria was measured regarding colonies producing a clear zone as the number of acid-producing bacteria after cultivation under anaerobic conditions in Anaeropack (trade name, Mitsubishi Gas Chemical Company, Inc.) at 25° C. for 5 days by a plate surface method using an MRS-layered chalk agar medium (Difco) having layers of $CaCO_3$.

*E. coli* and coliform bacteria were qualitatively measured by a conventional method after cultivation at 35° C. for 24 hours using a liquid medium Fluorocult LMX-Broth (MERCK). The measurement results for the numbers of viable bacterial cells, acid-producing bacteria, and *S. aureus* and the qualitative determination results for coliform bacteria in samples on Day 10 after storage are shown in Table 10.

TABLE 10

Day 10 after storage of spicy cod roe

|  | Test group | Control group |
|---|---|---|
| Number of acid-producing bacteria | $1.28 \times 10^7$ | $3.00 \times 10^3$ |
| Number of Viable bacterial cells | $7.70 \times 10^3$ | $5.40 \times 10^5$ |
| Number of *S. aureus* | $3.00 \times 10^3$ | $3.00 \times 10^3$ |
| Coliform bacteria | (—) | (—) |

As shown in Table 10, a level of $10^7$ CFU/g of acid-producing bacteria seemed to be derived from the inoculated lactic acid bacteria was observed in the test group, while a level of $10^3$ CFU/g or less of bacteria was observed in the control group. The test group suppressed the number of viable bacterial cells compared with the control group. In both groups, *S. aureus* was $10^3$ CFU/g or less and the number of coliform bacteria was negative.

Those results suggest that a bio-preservation effect is realized by the formation of a superior bacterial flora with respect to spicy cod roe due to the inoculation of the spicy cod roe or the like with lactic acid bacteria (K12 strain).

Example 3

Color Tone Improving Effect on Salmon Roe

For the purpose of confirming a color tone improving effect on salmon roe, lactic acid bacteria (K12 strain) obtained in Example 1 were inoculated to food additive-free salmon roe and the L*a*b* color was measured.

After the lactic acid bacteria were cultured in an MRS medium at 30° C. for 12 hours, the bacteria were washed with physiological saline, and a bacterial solution was prepared by enrichment using a low-temperature centrifuge (trade name "Himac 7D2", manufactured by Hitachi Ltd.).

Salmon roe was prepared by adding 3 parts by weight of saline having a concentration of 3 wt % at a water temperature of 10° C. to 1 part by weight of salmon eggs and washing. Then, 3 parts by weight of saturated saline were added to 1 part by weight of raw salmon roe followed by soaking while stirring for 20 minutes. The salmon roe after completion of soaking in this manner was divided into a test group inoculated with the bacterial solution of the K12 strain at $10^7$ CFU/g and a control group not inoculated with the strain. For draining, the salmon roe in each of the test group and control group was placed into polyamide bags provided with a water absorbent sheet (trade name: "Fresh Master Ultra", Unicharm Corporation) and vacuum packed using a vacuum packing machine and subjected to drained aging storage for 5 days in a fixed-temperature incubator set at 7° C. (trade name: "IN800", manufactured by Yamato Scientific Co., Ltd.).

The L*a*b* color of each group was measured at completion of salting and after drained aging storage using a spectrocolorimeter (trade name: "508i", manufactured by Konica Minolta Holdings, Inc.) and an average value was calculated. The results are shown in Table 11.

TABLE 11

Variation in a* value during aging storage of salted salmon roe inoculated with k12 strain

|  |  | a* average value |  |
|---|---|---|---|
| Test group | Raw eggs | 8.00 | A |
|  | Day 9 after aging storage | 5.44 | A |
| Control group | Raw eggs | 7.46 | A |
|  | Day 9 after aging storage | 2.87 | B |
| Positive control group | Raw eggs | 6.94 | A |
|  | Day 9 after aging storage | 2.27 | B |

*There is a significant difference between different symbols at a significance level of 1%.

From Table 11, it may be seen from the a* value expressing red color in the test group after drained aging, that decrease in the a* value is significantly low in comparison to the control group and positive control group and a red-color level is maintained which is almost the same as that of raw eggs.

Test Example 1

Screening From Distributed Strains

Screening for microorganisms having color tone improving effects on fish eggs was performed using microbial strains obtained from public distribution institutions. Note that, in Tables 12 and 13 below, strains assigned a JCM number are strains which were distributed from RIKEN BioResource Center. Those strains with an NBRC number are strains which were distributed from Department of Biotechnology, NITE Biological Resource Center, National Institute of Technology and Evaluation. Further, as a control, *Carnobacterium maltaromaticum* B64 strain, *Lactobacillus coryniformis* synonym R11 strain, *Lactobacillus coryniformis* K11 strain, and *Lactobacillus coryniformis* K12 strain isolated by the inventors of the present invention were simultaneously evaluated.

Since the genus, species name, and origin of the distributed strains was known, a primary selection using an MRS-modified chalk agar medium was not performed, and the respective culturing bacterial solutions were coated at $10^7$ per g on non-colored nitrite-free sliced ham, vacuum packed and stored at 7° C. (or an optimum growing temperature for the strain) for 14 days. Red-color change was evaluated visually to select the strains causing red-color change in ham.

Next, eggs were removed from cod roe or salted ovaries of Pacific cod (Pacific cod roe) and stirred well. A selected strain was inoculated while stirring at a concentration of $10^7$ CFU/g and stored under aerobic conditions at 7° C. for 14 days. The red-color change was evaluated visually in the same manner as the ham and a final selection was performed for strains in which a red-color change was observed in the cod roe or the Pacific cod roe.

The results are shown in Table 12.

JCM1166, JCM8341, JCM8342, JCM8343, JCM5816, JCM1157, JCM1098, NBRC3956, K11, and K12. Thus, the strains in which a red coloring effect was observed on both cod roe and Pacific cod roe were strains JCM1099, JCM1166, JCM8341, JCM8343, JCM1098, NBRC3956, K11, and K12. Strains JCM8342, JCM5816, and JCM1157 only displayed a red coloring effect on Pacific cod roe.

Note that, for a sample inoculated with the strain K12 in fish egg samples obtained in the test, the nitrite concentration of the obtained fish eggs was analyzed for the purpose of confirming the fact that the red coloring effect was not due to nitrites.

From the above-mentioned results, it was shown that in addition to *Lactobacillus coryniformis* K12 strain obtained in Example 1 above and *Carnobacterium maltaromaticum* B64 strain disclosed in Patent Document 4, lactic acid bacteria

TABLE 12

| | | | | | Organoleptic red color evaluation* | |
| --- | --- | --- | --- | --- | --- | --- |
| | Time of experiment | Strain number | | Ham | Cod roe | Pacific cod roe |
| 1 | 1 | JCM8129 | *Lactobacillus casei* | + | − | − |
| 2 | 1 | JCM1164 | *Lactobacillus coryniformis* subsp. *coryniformis* | + | − | − |
| 3 | 1 | JCM1099 | *Lactobacillus coryniformis* subsp. *torquens* | + | + | + |
| 4 | 1 | JCM1166 | *Lactobacillus coryniformis* subsp. *torquens* | + | + | + |
| 5 | 1 | JCM1091 | *Lactobacillus curvatus* | + | − | − |
| 6 | 1 | JCM1096 | *Lactobacillus curvatus* | + | − | − |
| 7 | 1 | JCM1188 | *Carnobacterium maltaromaticum* | + | − | − |
| 8 | 1 | JCM8341 | *Lactobacillus plantarum* subsp. *plantarum* | + | + | + |
| 9 | 1 | JCM8342 | *Lactobacillus plantarum* subsp. *plantarum* | + | − | + |
| 10 | 1 | JCM8343 | *Lactobacillus plantarum* subsp. *plantarum* | + | + | + |
| 11 | 1 | JCM5816 | *Carnobacterium divergens* | + | − | + |
| 12 | 1 | JCM10707 | *Lactobacillus kimchii* | − | − | − |
| 13 | 1 | JCM1157 | *Lactobacillus sakei* subsp. *sakei* | − | − | + |
| 14 | 1 | Control | — | − | − | − |
| 15 | 1 | B64** | *Carnobacterium maltaromaticum* | + | − | − |
| 16 | 1 | R11 | *Lactobacillus coryniformis* synonym | + | − | − |
| 17 | 1 | K11 | *Lactobacillus coryniformis* | + | + | + |
| 18 | 2 | JCM1095 | *Lactobacillus alimentarius* | − | − | − |
| 19 | 2 | JCM1097 | *Lactobacillus farciminis* | − | − | − |
| 20 | 2 | JCM9504 | *Lactobacillus suebicus* | − | − | − |
| 21 | 2 | JCM9695 | *Lactobacillus carnosoum* | − | − | − |
| 22 | 2 | JCM6124 | *Leuconostoc mesenteroides* subsp. *mesenteroides* | − | − | − |
| 23 | 2 | JCM9136 | *Carnobacterium maltaromaticum* | + | − | − |
| 24 | 2 | JCM2032 | *Pediococcus acidilactici* | − | − | − |
| 25 | 2 | JCM2028 | *Pediococcus pentosaceus* | − | − | − |
| 26 | 2 | NBRC3956*** | *Lactobacillus fermentum* | −(+) | + | + |
| 27 | 2 | NBRC15893 | *Lactobacillus sakei* subsp. *sakei* | − | − | − |
| 28 | 2 | NBRC12007 | *Lactobacillus lactis* subsp. *lactis* | + | − | |
| 29 | 2 | JCM1098 | *Lactobacillus coryniformis* subsp. *coryniformis* | + | + | + |
| 30 | 2 | K12 | *Lactobacillus coryniformis* | + | + | + |
| 31 | 2 | Control | — | − | − | − |

*Those samples evaluated on the basis of visual inspection as showing a red-color change are assigned + and those samples evaluated on the basis of visual inspection as not showing a red-color change are assigned −.
**Although the B64 strain displayed a red coloring effect on cod roe under anaerobic conditions, a red coloring effect on fish eggs was not observed under aerobic conditions.
***A bacterial solution of MBRC3956 strain was inoculated at $10^7$ per g of ham. Although a red coloring effect was not observed during storage at 7° C. for 14 days, a red coloring effect was observed during storage at 30° C. for 2 days.

With the exception of JCM10707, JCM1157, JCM1095, JCM1097, JCM9504, JCM9695, JCM6124, JCM2032, JCM2028, and NBRC15893, a red coloring effect on ham was observed with respect to all distributed strains. Further, for strains in which a red coloring effect was not observed on ham, a red coloring effect was not observed on cod roe or Pacific cod roe.

Distributed strains in which a red coloring effect was observed on cod roe were strains JCM1099, JCM1166, JCM8341, JCM8343, JCM1098, NBRC3956, K11, and K12. Distributed strains in which a red coloring effect was observed on Pacific cod roe were strains JCM1099, having a color tone improving effect on fish eggs may be obtained from various pools of microorganisms for use in processing fish eggs.

Test Example 2

Evaluation Using Calorimeter

Color tone evaluation of fish eggs obtained in Test Example 1 above was performed using a calorimeter in order to evaluate the level of color tone change (red-color change) based on objective color measurement data.

For the purpose of the evaluation, calorimetric data measurements were performed on the luminance axis L*, (red-green) axis a*, (yellow-blue) axis b* of an L*a*b* calorimetric system using a spectrocolorimeter (trade name: "508i", manufactured by Konica Minolta Holdings, Inc.). The calorimetric data were used to calculate a color difference based on Equation (1) below using an average value of three measurements for a single sample. The values were determined using a value of 1.0 (NBS unit) as a standard value, which is in a range of 0.5 to 1.5 (NBS unit) defined as a "slight" difference by the U.S. National Bureau of Standards. More specifically, a color tone change was determined when an observed value was greater than or equal to that standard value. No color tone change was determined when an observed value was less than that standard value. Statistical analysis by multicomparison using Dunnett's test was employed to compare the test group with the control group.

[Chem 1]

$$\text{Color difference } \Delta E=[(\Delta L^*)^2+(\Delta a^*)^2+(\Delta b^*)^2]^{1/2} \quad (1)$$

The results are shown in Table 13.

TABLE 13

| | | | Cod Roe | | | | | |
|---|---|---|---|---|---|---|---|---|
| Time of experiment | Strain number | | Organol eptic red color evaluation | L* | a* | Δa* difference | Greater than or equal to NBS1 | Significant difference | b* |
| 1 | 1 | JCM8129 | − | 49.56 | 3.72 | 0.10 | | | 10.73 |
| 2 | 1 | JCM1164 | − | 50.21 | 3.46 | −0.15 | | | 11.00 |
| 3 | 1 | JCM1099 | + | 48.69 | 5.06 | 1.44 | ** | ** | 9.85 |
| 4 | 1 | JCM1166 | + | 49.73 | 5.33 | 1.72 | ** | ** | 9.69 |
| 5 | 1 | JCM1091 | − | 50.09 | 3.38 | −0.23 | | | 11.21 |
| 6 | 1 | JCM1096 | − | 50.01 | 3.58 | −0.04 | | | 11.12 |
| 7 | 1 | JCM1188 | − | 48.72 | 3.38 | −0.24 | | | 10.70 |
| 8 | 1 | JCM8341 | + | 50.63 | 4.01 | 0.40 | | * | 10.79 |
| 9 | 1 | JCM8342 | − | 49.69 | 3.75 | 0.14 | | | 11.69 |
| 10 | 1 | JCM8343 | + | 50.84 | 4.33 | 0.72 | ** | * | 11.45 |
| 11 | 1 | JCM5816 | − | 49.32 | 3.48 | −0.14 | | | 10.98 |
| 12 | 1 | JCM10707 | − | 50.11 | 4.13 | 0.52 | | * | 11.50 |
| 13 | 1 | JCM1157 | − | 50.97 | 3.70 | 0.09 | | | 10.41 |
| 14 | 1 | Control | − | 50.33 | 3.61 | 0.00 | | | 10.92 |
| 15 | 1 | B64 | − | 50.21 | 3.54 | −0.07 | | | 11.01 |
| 16 | 1 | R11 | − | 50.33 | 3.61 | 0.00 | | | 11.47 |
| 17 | 1 | K11 | + | 49.81 | 4.97 | 1.36 | ** | ** | 10.16 |
| 18 | 2 | JCM1095 | − | 49.89 | 3.46 | −0.11 | | | 9.08 |
| 19 | 2 | JCM1097 | − | 49.06 | 3.15 | −0.42 | | | 9.59 |
| 20 | 2 | JCM9504 | − | 47.75 | 3.50 | −0.06 | | | 10.45 |
| 21 | 2 | JCM9695 | − | 51.31 | 3.08 | −0.49 | | | 8.76 |
| 22 | 2 | JCM6124 | − | 48.73 | 3.82 | 0.26 | | | 10.15 |
| 23 | 2 | JCM9136 | − | 49.39 | 3.32 | −0.25 | | | 10.09 |
| 24 | 2 | JCM2032 | − | 49.73 | 3.79 | 0.23 | | | 9.92 |
| 25 | 2 | JCM2028 | − | 48.27 | 3.87 | 0.31 | | | 11.14 |
| 26 | 2 | NBRC3956 | + | 49.86 | 4.30 | 0.73 | ** | ** | 8.98 |
| 27 | 2 | NBRC15893 | − | 48.55 | 3.72 | 0.16 | | | 10.57 |
| 28 | 2 | NBRC12007 | − | 50.05 | 3.08 | −0.49 | | | 9.30 |
| 29 | 2 | JCM1098 | + | 48.86 | 5.24 | 1.67 | ** | ** | 9.68 |
| 30 | 2 | K12 | + | 50.16 | 5.73 | 2.16 | ** | ** | 8.43 |
| 31 | 2 | Control | − | 49.21 | 3.57 | 0.00 | | | 11.09 |

| | Pacific cod Roe | | | | | | |
|---|---|---|---|---|---|---|---|
| | Organol eptic red color evaluation | L* | a* | Δa* difference | Greater than or equal to NBS1 | Significant difference | b* |
| 1 | − | 55.96 | 2.527 | −0.23 | | | 12.94 |
| 2 | − | 54.33 | 2.817 | 0.06 | | | 14.84 |
| 3 | + | 54.12 | 4.217 | 1.46 | ** | ** | 14.88 |
| 4 | + | 54.45 | 4.19 | 1.43 | ** | ** | 14.74 |
| 5 | − | 53.91 | 2.657 | −0.10 | | | 14.79 |
| 6 | − | 55.13 | 2.473 | −0.28 | | | 15.22 |
| 7 | − | 53.42 | 3.037 | 0.28 | | | 15.31 |
| 8 | + | 54.71 | 4.723 | 1.97 | ** | ** | 15.8 |
| 9 | + | 54.79 | 3.417 | 0.66 | ** | ** | 15.21 |
| 10 | + | 55.47 | 4.877 | 2.12 | ** | ** | 15.43 |
| 11 | + | 54.66 | 6.367 | 3.61 | ** | ** | 15.42 |
| 12 | − | 53.94 | 2.863 | 0.11 | | | 15.65 |
| 13 | + | 53.6 | 4.187 | 1.43 | ** | ** | 15.4 |
| 14 | − | 54.79 | 2.757 | 0.00 | | | 15.56 |

TABLE 13-continued

| | | | | | | | |
|---|---|---|---|---|---|---|---|
| 15 | − | 54 | 2.58 | −0.18 | | | 15.62 |
| 16 | − | 55.1 | 2.203 | −0.55 | | | 14.42 |
| 17 | + | 54.74 | 3.33 | 0.57 | | ** | 14.6 |
| 18 | − | 56.04 | 1.08 | −0.43 | | | 11.43 |
| 19 | − | 56.49 | 1.183 | −0.33 | | | 11.22 |
| 20 | − | 57.21 | 1.11 | −0.40 | | | 11.06 |
| 21 | − | 55.96 | 1.14 | −0.37 | | | 11.22 |
| 22 | − | 55.8 | 1.333 | −0.18 | | | 11.28 |
| 23 | − | 56.79 | 0.747 | −0.77 | | | 11.59 |
| 24 | − | 56.57 | 1.357 | −0.16 | | | 11.18 |
| 25 | − | 56.86 | 1.147 | −0.37 | | | 10.83 |
| 26 | + | 56.45 | 1.847 | 0.33 | | ** | 10.75 |
| 27 | − | 56.27 | 1.17 | −0.34 | | | 11.72 |
| 28 | | | | | | | |
| 29 | + | 56.13 | 2.043 | 0.53 | | ** | 11.15 |
| 30 | + | 54.54 | 4.087 | 2.57 | ** | ** | 10.49 |
| 31 | − | 56.98 | 1.513 | 0.00 | | | 11.22 |

The results demonstrated a correspondence in the experiment of all strains, except strain JCM8341 for cod roe and strains K11, NBRC3956, and JCM1098 for Pacific cod roe, for red-color change determined by visual inspection (color tone evaluation) and for evaluation by colorimetric data. Thus, objective evaluation of the level of color tone change (red-color change) was made based on calorimetric data using a calorimeter.

A correlation for each of variables L*, a*, and b* was calculated using an organoleptic red-color evaluation score of 1 for red-color change determined by visual inspection and an organoleptic red-color evaluation score of 0 for no red-color change determined by visual inspection. The relation shown in Table 14 was obtained.

TABLE 14

| | ΔL* | Δa* | Δb* | Organoleptic red-color evaluation |
|---|---|---|---|---|
| Cod roe | | | | |
| ΔL* | 1.00 | −0.27 | −0.20 | −0.03 |
| Δa* | −0.27 | 1.00 | −0.44 | 0.82 |
| Δb* | −0.20 | −0.44 | 1.00 | −0.40 |
| Organoleptic red-color evaluation | −0.03 | 0.82 | −0.40 | 1.00 |
| Pacific cod roe | | | | |
| ΔL* | 1.00 | −0.60 | −0.73 | −0.21 |
| Δa* | −0.60 | 1.00 | 0.68 | 0.57 |
| Δb* | −0.73 | 0.68 | 1.00 | 0.05 |
| Organoleptic red-color evaluation | −0.21 | 0.57 | 0.05 | 1.00 |

As clearly shown by Table 14, when cod roe was tested, there was a positive correlation of 0.82 between visual red-color evaluation and the a* value on the (red-green) axis of the L*a*b* calorimetric system. When Pacific cod roe was tested, a weaker positive correlation of 0.57 was observed.

Thus, it was clarified that a method of evaluation using the a* value measured by a colorimeter was useful as a method of objective evaluation of the level of red-color change in fish eggs.

Example 3

Color Loss Suppression Effect on Additive-Free Salmon Roe

Strains of microorganisms obtained from a public distribution institution were used in screening for microorganisms having a suppression effect on color tone loss in additive-free salmon roe. In Tables 15 and 16 below, strains assigned a JCM number are strains which were distributed from RIKEN Bioresource Center. Those strains with an NBRC number are strains which were distributed from Department of Biotechnology, NITE Biological Resource Center, National Institute of Technology and Evaluation. Evaluation was also performed, as a control, for *Lactobacillus coryniformis* K11 strain and *Lactobacillus coryniformis* K12 strain isolated by the inventors of the present invention.

Screening was performed as follows. Each strain was inoculated at a concentration of $10^7$ CFU/g onto homogenized salmon roe obtained by finely separating and stirring salmon roe. A control group having no additives was prepared. Then, the groups were stored under aerobic conditions for 15 days at 7° C. Determination was performed by contrasting by visual inspection the color loss of the salmon roe to select strains having an effect of suppressing color loss.

The results are shown in Table 15.

TABLE 15

| | Strain Number | | Organoleptic color loss evaluation |
|---|---|---|---|
| 1 | JCM 8129 | *Lactobacillus casei* | 1 |
| 2 | JCM 1098 | *Lactobacillus coryniformis* subsp. *coryniformis* | 1 |
| 3 | JCM 1164 | *Lactobacillus coryniformis* subsp. *coryniformis* | 0 |
| 4 | JCM 1099 | *Lactobacillus coryniformis* subsp. *torquens* | 1 |
| 5 | JCM 1166 | *Lactobacillus coryniformis* subsp. *torquens* | 0 |
| 6 | JCM 8341 | *Lactobacillus plantarum* subsp. *plantarum* | 0 |
| 7 | JCM 8342 | *Lactobacillus plantarum* subsp. *plantarum* | 0 |
| 8 | JCM 8343 | *Lactobacillus plantarum* subsp. *plantarum* | 1 |
| 9 | JCM 1097 | *Lactobacillus farciminis* | 1 |
| 10 | JCM 2032 | *Pediococcus acidilactici* | −1 |
| 11 | JCM 3956 | *Lactobacillus fermentum* | 0 |
| 12 | JCM 12007 | *Lactobacillus lactis* subsp. *lactis* | 0 |
| 13 | JCM 5818 | *Lactobacillus kefiri* | 1 |
| 14 | JCM 9136 | *Carnobacterium maltaromaticum* | 0 |
| 15 | K11 | *Lactobacillus coryniformis* | 1 |
| 16 | K12 | *Lactobacillus coryniformis* | 1 |

In order to evaluate the figures shown in Test Example 4 below, an organoleptic color loss evaluation score of 1 was assigned for a determination that color loss was not observed in comparison to the control as a result of visual inspection, an organoleptic red-color evaluation score of 0 was assigned for a determination that color was approximately the same as the control as a result of visual inspection, and an organoleptic red-color evaluation score of −1 is assigned for a determination that color loss was observed in comparison to the control as a result of visual inspection. Strains for which a color loss was not observed were JCM8129, JCM1098, JCM1099, JCM8343, JCM1097, JCM5818, K11, and K12.

Test Example 4

Color Loss Evaluation Using Colorimeter

Color tone evaluation of fish eggs obtained in the Test Example above was performed using a calorimeter to evaluate the level of color tone loss based on objective color measurement data. As a result, a test group inoculated with each strain and a non-inoculated control group were prepared and measured using a spectrocolorimeter in the same manner as Test Example 2 above. Statistical analysis was performed using a t Test adapted to each strain.

The results are shown in Table 16.

method of evaluation using the a* value measured by a calorimeter was useful as a method of objective evaluation of the level of color tone loss in fish eggs.

The invention claimed is:
1. A method of processing fish eggs, comprising adding a lactic acid bacterium having a color tone improving effect on fish eggs to fish eggs,
  wherein the lactic acid bacterium is at least one species selected from the group consisting of *Lactobacillus coryniformis* and *Lactobacillus plantarum*, and
  wherein the color tone improving effect is present if;
    (1) the difference in a* value of L*a*b* system is 0.6 or more to cod roe, and

TABLE 16

| Strain Number | Organoleptic color loss evaluation | Test group L* | Control group L* | ΔL* | Test group a* | Control group a* | Δa* | Significant difference p value | Test group b* | Control group b* | Δb* |
|---|---|---|---|---|---|---|---|---|---|---|---|
| 1 JCM 8129 | 1 | 31.75 | 30.58 | 1.18 | 6.13 | 4.40 | 1.73 | 0.08 | 3.30 | 3.19 | 0.10 |
| 2 JCM 1098 | 1 | 32.71 | 30.25 | 2.46 | 5.16 | 4.40 | 0.76 | 0.38 | 2.67 | 3.05 | −0.38 |
| 3 JCM 1164 | 0 | 31.84 | 31.13 | 0.71 | 4.69 | 4.44 | 0.25 | 0.63 | 2.08 | 2.75 | −0.67 |
| 4 JCM 1099 | 1 | 31.71 | 30.35 | 1.36 | 4.63 | 4.27 | 0.36 | 0.53 | 2.18 | 2.85 | −0.67 |
| 5 JCM 1166 | 0 | 31.58 | 30.10 | 1.48 | 4.33 | 3.85 | 0.48 | 0.38 | 1.89 | 2.26 | −0.37 |
| 6 JCM 8341 | 0 | 31.85 | 29.52 | 2.33 | 4.16 | 4.78 | −0.61 | 0.31 | 1.68 | 2.87 | −1.19 |
| 7 JCM 8342 | 0 | 31.55 | 29.74 | 1.81 | 4.17 | 4.13 | 0.04 | 0.90 | 1.71 | 2.60 | −0.89 |
| 8 JCM 8343 | 1 | 31.57 | 29.78 | 1.79 | 5.55 | 4.16 | 1.38 | 0.08 | 2.34 | 2.45 | −0.11 |
| 9 JCM 1097 | 1 | 32.37 | 30.25 | 2.12 | 3.97 | 3.09 | 0.88 | 0.41 | 1.95 | 2.23 | −0.28 |
| 10 JCM 2032 | −1 | 32.55 | 29.90 | 2.66 | 2.98 | 3.81 | −0.82 | 0.36 | 1.57 | 2.52 | −0.95 |
| 11 JCM 3956 | 0 | 31.31 | 29.06 | 2.25 | 4.08 | 4.16 | −0.08 | 0.92 | 1.33 | 2.49 | −1.16 |
| 12 JCM 12007 | 0 | 32.01 | 29.23 | 2.78 | 5.27 | 4.86 | 0.41 | 0.64 | 2.65 | 3.13 | −0.48 |
| 13 JCM 5818 | 1 | 32.42 | 28.53 | 3.89 | 7.70 | 7.16 | 0.54 | 0.58 | 3.86 | 4.42 | −0.56 |
| 14 JCM 9136 | 0 | 32.69 | 28.42 | 4.28 | 7.85 | 7.64 | 0.21 | 0.72 | 3.96 | 4.71 | −0.75 |
| 15 K11 | 1 | 31.57 | 29.79 | 1.78 | 5.29 | 3.50 | 1.79 | 0.03* | 2.12 | 2.53 | −0.41 |
| 16 K12 | 1 | 29.78 | 28.43 | 1.35 | 6.14 | 4.64 | 1.49 | 0.03* | 3.65 | 2.92 | 0.73 |

Four strains, JCM8129, JCM8343, K11 and K12, showed a Δa*, which is a difference between the a* values, on the (red-green) axis of the L*a*b* calorimetric system, of greater than or equal to 1.5 (converted to 1.5 in NBS unit), and the four strains were evaluated as +1 for color loss comparison.

When a correlation was calculated for each variable of the color phases L*, a*, and b* and the visual color loss evaluation, the relation shown in Table 17 was obtained.

TABLE 17

|  | Organoleptic color loss evaluation | ΔL* | Δa* | Δb* |
|---|---|---|---|---|
| Organoleptic color loss evaluation | 1 | −0.259 | 0.8377 | 0.5975 |
| ΔL* | −0.259 | 1 | −0.34 | −0.3441 |
| Δa* | 0.8377 | −0.34 | 1 | 0.7934 |
| Δb* | 0.5975 | −0.3441 | 0.7934 | 1 |

As clearly shown by Table 17, a positive relation of 0.83 was shown between the color loss evaluation value by visual inspection and the a* value on the (red-green) axis of the L*a*b* calorimetric system. Thus, it was clarified that a (2) the difference in a*value of L*a*b* system is 0.6 or more to pacific cod roe,
    when compared between adding and not adding of the lactic acid bacterium.

2. A method of processing fish eggs according to claim 1, wherein the lactic acid bacterium having a color tone improving effect is at least one species selected from the group consisting of *Lactobacillus coryniformis* K12 (FERM BP-10945), *Lactobacillus coryniformis* subsp. torquens (JCM 1099), *Lactobacillus coryniformis* subsp. torquens (JCM 1166), and *Lactobacillus plantarum* subsp. Plantarum (JCM8343).

3. A method of processing fish eggs according to claim 1, comprising adding the lactic acid bacterium before, during, or after a soaking treatment, when the fish eggs are subjected to the soaking treatment using an aqueous solution containing salt and/or a flavoring solution.

4. A method of processing fish eggs according to claim 1, wherein the fish eggs are eggs selected from eggs of cod, trout, salmon, flying fish, mullet, sea bream, sturgeon, herring, tuna, lampfish, shishamo smelt, sandfish, and sweetfish.

* * * * *